US005894183A

United States Patent [19]
Borchert

[11] Patent Number: 5,894,183
[45] Date of Patent: Apr. 13, 1999

[54] PERMANENT MAGNET GENERATOR ROTOR

[75] Inventor: David T. Borchert, Kasota, Minn.

[73] Assignee: Caterpillar Inc., Peoria, Ill.

[21] Appl. No.: 08/739,385

[22] Filed: Oct. 29, 1996

[51] Int. Cl.$^6$ .................................. H02K 21/12
[52] U.S. Cl. .................. 310/261; 310/156; 310/152; 310/262; 310/267; 310/268; 310/218
[58] Field of Search .................. 310/156, 262, 310/261, 267, 268, 152, 218

[56] References Cited

U.S. PATENT DOCUMENTS 4,316,111  2/1982  Merki et al. ................. 310/218
4,393,320  7/1983  Anderson .................... 310/156

Primary Examiner—Clayton LaBalle
Assistant Examiner—Timothy A. Williams
Attorney, Agent, or Firm—Moore & Hansen

[57] ABSTRACT

A permanent magnet rotor for an electric generator or motor has a core lamination hub formed of a stack of generally round plates with peripheral slots for holding the first end of a rectangular magnet. Each magnet has an outer end which is held by a slotted pole piece formed of laminated plates. First and second side plates overlie each side of the hub, magnets and pole pieces, and fasteners such as rivets are passed through holes in the side plates, hub plates and pole pieces to form a rigid rotor in which each rectangular magnet is supported and restrained on all six sides. A method for fabricating the rotor is also disclosed.

13 Claims, 3 Drawing Sheets

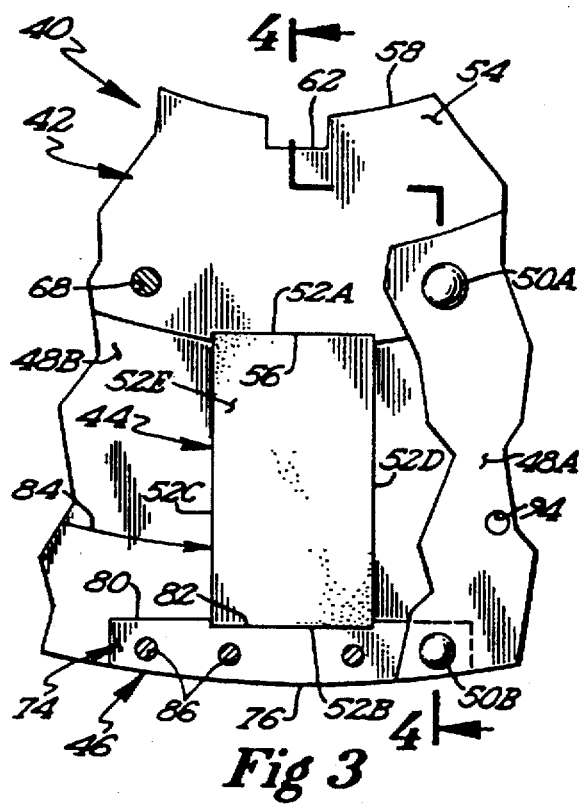
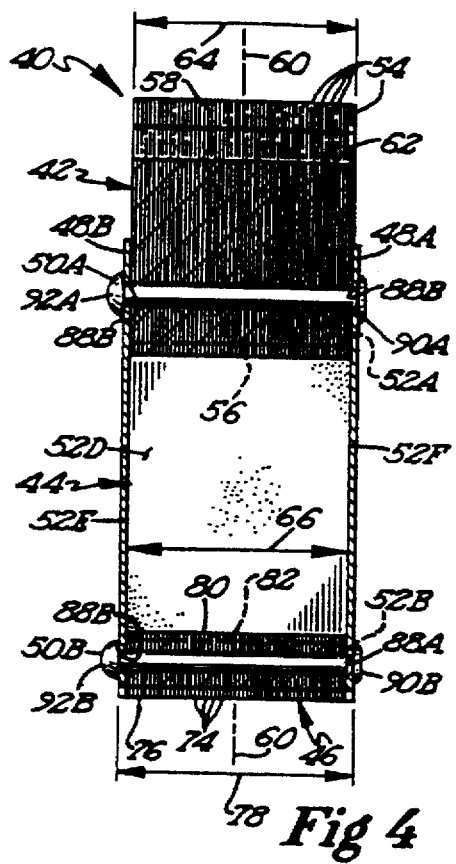
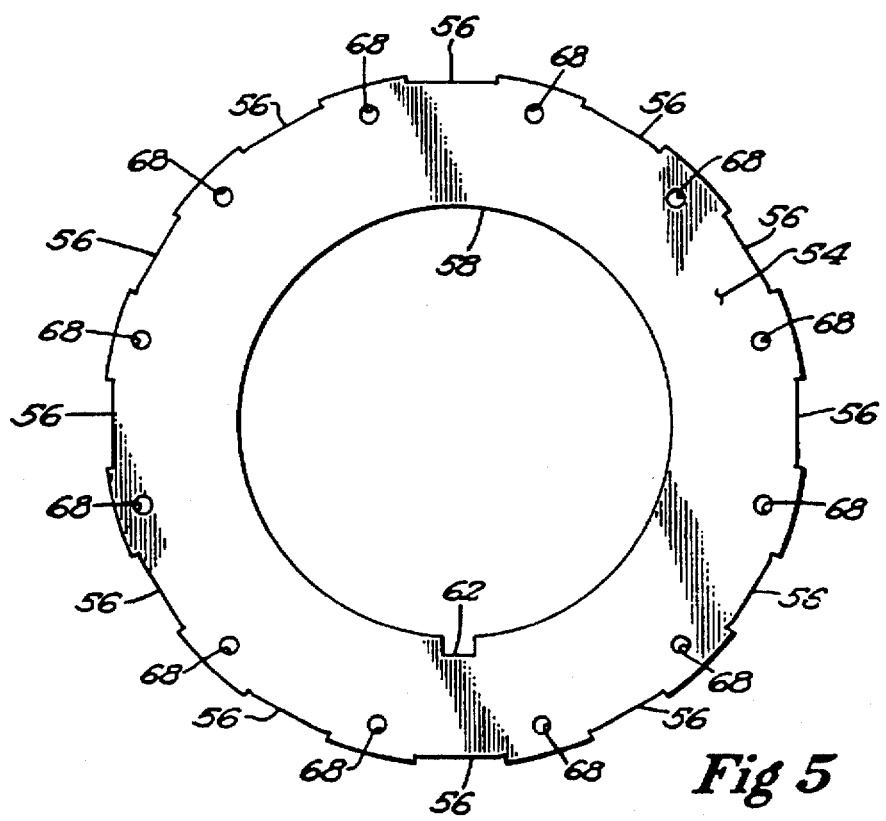

PERMANENT MAGNET GENERATOR ROTOR

BACKGROUND OF THE INVENTION

This invention relates generally to a rotor for an electrical energy conversion transducer such as a generator or electric motor. More particularly, this invention pertains to a rotor assembly having permanent magnets attached thereto and is well suited for use with an electric permanent magnet generator.

Electric motors and generators utilize a rotor which rotates within a cage, the cage having stationary wire windings and comprising a stator. For example, a generator may have a rotor with permanent magnets mounted about the rotor circumference. This type of generator rotor produces a rotating magnetic field, and the generated current is taken directly from the stator. Similarly, certain motors may also utilize a permanent magnet rotor and a stator whose coils are selectively energized by a power source to cause the rotor to turn.

One well known rotor construction has a one-piece steel hub having a cylindrical outer periphery machined to provide the desired number and spacing of flat surfaces upon which permanent magnets are mounted. Each magnet has a rectangular or circular cross-section with a central axial bolt hole. A sintered iron "pole tip" or "shoe" with a center hole is mounted atop each magnet. A non-magnetic bolt is passed through the holes of the pole tip and magnet, being screwed into a threaded radial hole tapped into the flat machined mounting surface of the hub to hold one end face of the magnet against the machined surface. A known, but more costly variation of this mounting arrangement utilizes a shallow groove machined into each of the otherwise flat mounting surfaces and has the ends of the magnets partially constrained within these grooves. This arrangement causes the hub and its groove to engage and constrain three of the six faces of the typical rectangular magnets used with such rotors.

While this common rotor construction is effective and has been in use for many years, it has a number of well-known shortcomings.

First, the sintered iron pole tip is brittle, and being largely exposed, is easily broken if hit by another object. When installing a rotor within the stator of a motor or generator housing, the rotor can be suddenly and somewhat strongly pulled into the narrow, closely fitted rotor chamber of the stator by magnetic force, sometimes causing a bolt head or the pole tip itself to hit the stator housing and crack or damage the pole tip.

Second, there are difficulties in attaching the magnet to the hub. To prevent movement between the pole tips, magnets and the machined surfaces of the hub, adhesive has been used between these members. Effective use of an adhesive requires that the mating surfaces be scrupulously clean. It has also been found in practice that if the magnet or pole tip is bumped, the adhesive sometimes shatters and thereafter becomes ineffective.

Third, the bolts which attach the magnets and pole tips to the hub must be non-magnetic to prevent undesirable leakage of magnetic flux through the bolt hole and along the bolts. Thus, weaker and more expensive metals such as stainless steel must be used in the bolts instead of hardened steel. The rotor design must account for this lower strength, often by using thicker, heavier and more expensive bolts.

Fourth, the bolt hole formed in the magnet reduces the magnet's field strength and thus the net power production of the transducer is reduced.

Fifth, molding of the sintered pole tips with the central bolt hole requires a core in the mold and produces variable pole tip dimension tolerances for its bolt hole; assembly may require the use of shimming washers or other reshaping of the pole tip to attain proper alignment. Sintered materials cannot be easily machined, often requiring grinding as the alternative to shimming with washers. If the outer periphery of the pole tips are machined after assembly of the rotor to produce a uniform rotor-stator air gap, extreme care must be taken in the machining, using a very thin cut. Nevertheless, the sintered pole tips sometimes still break.

Sixth, the presence of the central hole in the sintered steel pole tip results in a loss of magnetic field strength and a resulting loss of rotor efficiency.

Seventh, the hub requires exacting machining to produce accurate and smooth surfaces for attachment of the magnets. The hub is expensive to manufacture, and a slight misalignment results in a hub which is unbalanced. Time consuming placement of shimming washers between the magnet and hub is sometimes required to bring the magnets into alignment. If not properly aligned, such misalignment during operation may lead to unwanted vibration, loosening of the bolts, breakage of pole tips and/or magnets, and, worst of all, catastrophic rotor failure and a required shutdown of the motor or generator for repairs. In some applications, such as uninterruptable power systems, the unplanned shutdown of a generator or crucial motor can be very costly to a user.

Eighth, forces exerted on the attachment bolts now used to secure the magnets and pole tips have a major longitudinal vector, tending to stretch the bolts and sometimes leading to further loosening of the magnets and pole tips.

Ninth, if an attachment bolt is over-torqued during installation, the brittle pole tip can be easily broken.

Tenth, the magnets are supported at only one end, and thus are subject to bending forces. During operation significant torque must be absorbed by the magnets, the pole tips and the attachment bolts, and this torque tends to sometimes loosen the bolts and cause eventual rotor failure.

While the above list of problems or disadvantages of the prior art rotor is not exhaustive, it suggests a need for improvement in rotor design.

One particular use of a smaller permanent magnet generator is as a "pilot exciter" for a large brushless field generator wherein the exciter operates off the same driveshaft. When a heavy starting load or short-circuit condition overloads the field generator, the exciter supplies constant voltage to the field generator's voltage regulator, forcing the field generator into saturation and supplying the necessary output current to handle the starting load or clear the fault condition, i.e. trip the circuit breaker.

In this generating application, it is extremely important to minimize the exciter downtime, since an excessive starting load or short-circuit condition which is not exciter-enhanced may result in shutdown of the field generator. Thus, it is desirable to eliminate the possibilities of rotor failure due to any of the reasons indicated above, and to develop a rotor with greater reliability using simpler construction techniques and at lower cost.

BRIEF SUMMARY OF THE INVENTION

A new construction of a rotor is herein described which is more easily and quickly fabricated, at less cost. The new rotor is much less subject to breakage, and even if damaged, does not cause the catastrophic damage to the stator typical of prior designs. The permanent magnets and pole tips are not held by radially directed bolts which may loosen. The pole tips or pole pieces are formed of low carbon steel rather than sintered iron and held by a plurality of fasteners. Thus, the magnets and pole tips cannot be broken by contact with the stator during rotation or installation.

With the invention machining is minimized, largely being replaced by faster and much less expensive stamping and punching operations applied to relatively thin sheet or plate material.

With the invention magnets and pole tips do not require central axial holes for passage of a bolt therethrough. Thus, they are stronger, less costly to manufacture, and the loss of magnetic field strength due to presence of the holes is eliminated.

During assembly, the magnets and pole tips are self-aligning, eliminating the criticality of alignment common with prior art rotors.

In the assembled rotor, the six sided rectangular magnets most commonly used in rotor construction cannot turn or become misaligned, being rigidly supported on all six sides, rather than one or three sides as in the prior art.

The rotor comprises (a) a laminated core hub having peripheral slots, (b) laminated pole pieces or shoes with slots on one side, (c) permanent magnets having dimensions which fit into the slots of the hub and pole pieces, and (d) side plates.

The entire rotor is held together as a rigid assembly by elongate fasteners such as rivets passing through matching holes in the side plates, hub and pole pieces. The permanent magnets require no fastener holes but are simply captured within the slots of the hub and pole pieces, and are held between the side plates. The sole magnetic conductors between the hub and pole pieces are the magnets themselves. The interpole spaces between the magnets define open air gaps.

While the hub and pole pieces are formed of a magnetic material such as mild steel or hardened steel, the side plates are formed of a non-magnetic material such as stainless steel or aluminum. The fasteners may be formed of either a magnetic material such as steel or a non-magnetic material e.g. stainless steel, because in any case they do not complete an active magnetic circuit. Steel is a metal of choice because it has higher strength and is less expensive than stainless steel.

This new and rugged rotor may be placed on a mandrel and its outer periphery easily cut, i.e. machined to the desired uniform rotor-stator air gap, with a highly concentric shape, without is breakage of the pole pieces. The slow and cautious machining that was required with sintered pole tips, and the resulting breakage that still occasionally occurred, is eliminated by the invention.

Following assembly, the rotor is preferably impregnated with a protective coating, e.g. an epoxy varnish. The coating material impregnates and fills the spaces between laminated plates, and between the magnets and the members by which they are held.

While prior art rotors could be balanced only on the hub, the new rotor accommodates balance weights in punched holes on the side plates, easily achieving a precision balance. The rotor may be precision-balanced following application of the protective coating.

The above indicated advantages as well as other advantages of the invention will be readily understood by reading the following description in conjunction with the accompanying figures of the drawings wherein like reference numerals have been applied to designate like elements throughout the several views.

BRIEF DESCRIPTION OF THE DRAWINGS

FIG. 3 is a partial side view of a portion of the assembled rotor of FIG. 2 with a part of the side plate cut away.

FIG. 4 is a cross-sectional view of a portion of the rotor of the invention taken in the direction of cutting plane 4—4 of FIG. 3;

FIG. 5 is a plan view of a single laminate member used to form the hub of the rotor of FIG. 2;

DESCRIPTION OF THE PREFERRED EMBODIMENTS

Figure 1:
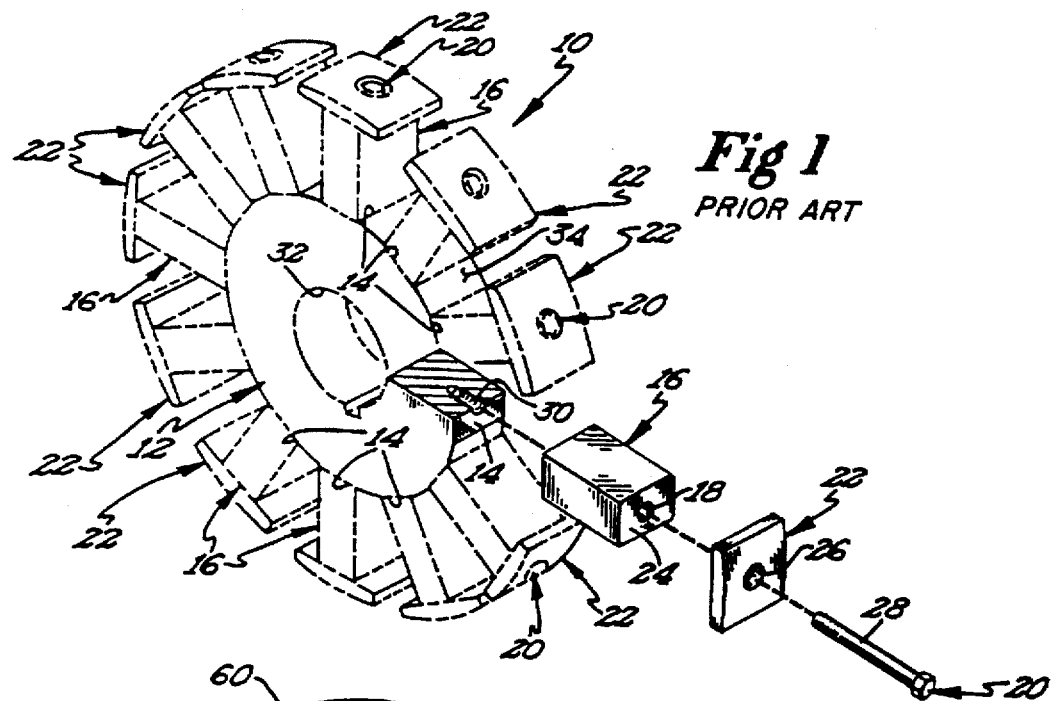
FIG. 1 is a perspective view of an electric generator rotor of the prior art.

With reference to FIG. 1, a prior art rotor assembly 10 is shown having a one-piece steel hub 12 with a driveshaft bore 32. A multiplicity of flat mounting surfaces 14 are spaced from one another and machined on the periphery 34 of the hub 12, and permanent magnets 16 are mated and attached to the surfaces 14 to extend radially from the hub 12. Each magnet 16 is rectangular in cross-section, having a central bolt hole 18 through which a bolt 20, formed of non-magnetic material, is passed. A pole tip 22, also known as a "pole piece" or "shoe", is radially positioned on the outer end 24 of each magnet 16 and has a central countersunk hole 26 through which the shaft 28 of the bolt 20 extends and with the bolt head holding the pole tip 22 firmly against end 24 of the magnet 16. The shaft 28 of each bolt 20, after passing through the pole tip 22 and magnet 16, is screwed into a threaded hole 30 in the machined surface 14 to hold the pole tip and magnet in place. This rotor construction is subject to the many problems discussed above under the heading "Background of the Invention".

As shown in FIGS. 2–5, the improved rotor 40 of the invention is an assemblage of a laminated hub 42, a plurality of permanent magnets 44, a plurality of laminated pole pieces 46, and side plates 48A and 48B. Elongate fasteners 50 such as rivets are passed through the side plates 48A and 48B, hub 42 and pole pieces 46 to join the components together as a unitary rotor 40. All six sides 52A, 52B, 52C, 52D, 52E and 52F of each magnet 44 are held and restrained by the cooperation between hub 42, pole pieces 46, and side plates 48A and 48B.

As shown in the drawings, the components of the entire rotor 40, except where specifically stated otherwise, are arranged in mirror symmetry about a central vertical radial plane 60. Consequently, a description of the parts in one side serves equally to identify the parts in the opposite side.

Figure 2:
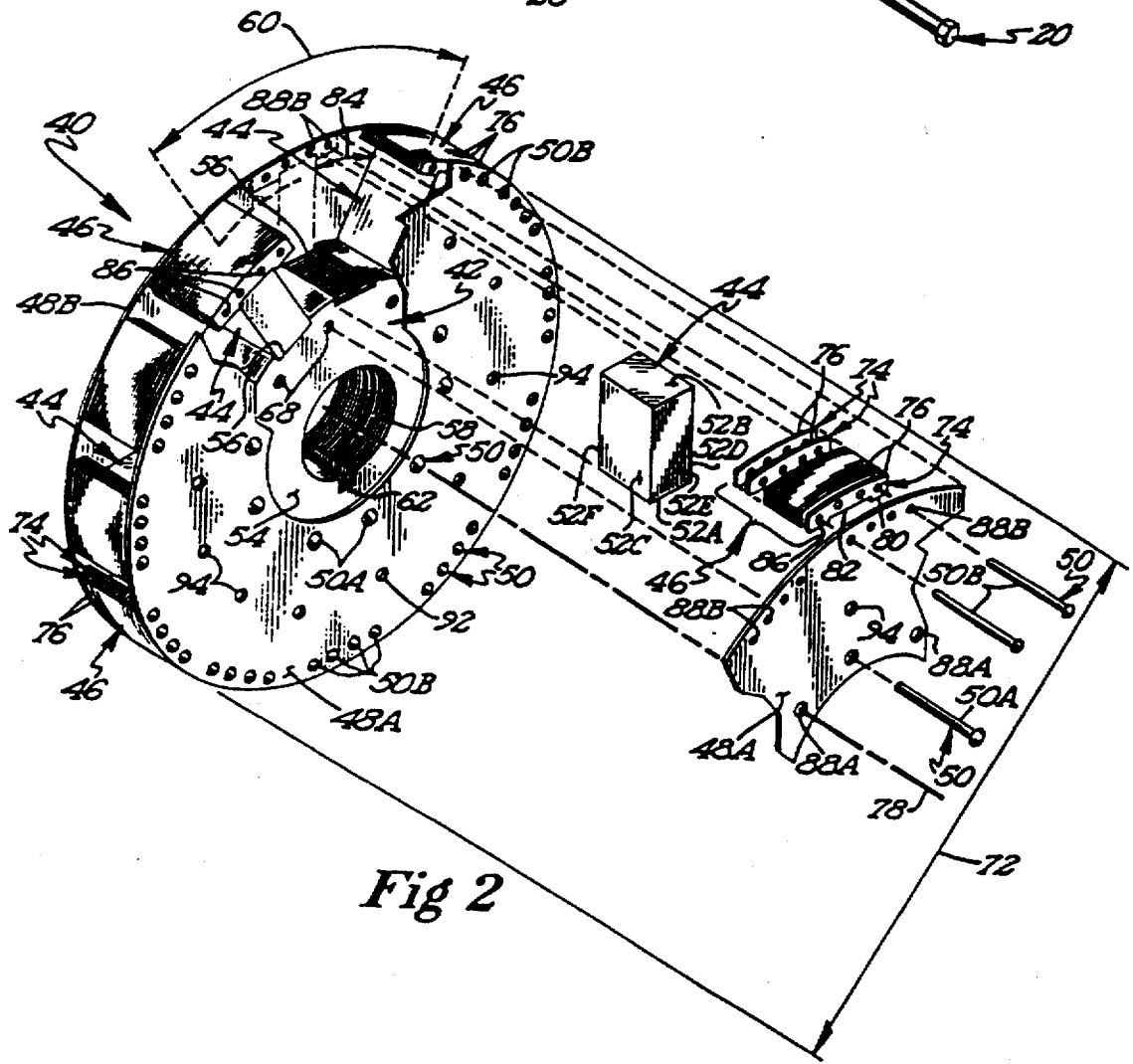
FIG. 2 is a partially exploded perspective view of a rotor embodying the invention.

As illustrated in FIGS. 2, 3 and 5, the hub 42 of rotor 40 is formed of a plurality of hub members 54 which are axially stacked. The hub members 54 are generally circular or polygonal and cut or stamped from a sheet or plate of magnetically conductive metal such as low carbon steel. Each hub member 54 is stamped or cut to have a central driveshaft hole 58 and a keyway 62. The shaft hole 58 has an axis of rotation 78, and a rotatable shaft, not shown, is mounted within the shaft hole when the rotor is to be installed in the generator or motor. A plurality of peripheral slots 56 on the member 54 are stamped or cut to hold the inner ends 52A of an array of permanent magnets 44, and restrain the magnets on their third and fourth sides 52C, and 52D, as best seen in FIG. 3.

If desired, the shaft hole 58 may be stamped to accommodate the largest shaft anticipated to be used with the rotor 40. The rotor 40 may then be readily mounted on smaller diameter shafts, using a size-reducing bushing, not shown. In this way, a single size rotor 40 may be used with a variety of shaft sizes. The keyway 62 with an appropriate key is used to secure the hub to the shaft or bushing.

A plurality of hub members 54 is stacked to form the hub 42 with a width 64 (FIG. 4) equal to or slightly greater than the width 66 of the magnet 44. Thus, an exemplary rotor 40 may use magnets 44 with a width of 2.00 inches. In such a rotor 40, 32 hub members 54 stamped from 16 gauge steel sheet material (0.0625 inch thickness) will form a total width of about 2 inches, providing the required space for the magnets 44 between the two side plates 48A and 48B. As purchased from a vendor, magnets 44 typically have a relatively large dimension variance. When such is the case, it is prudent to provide extra space e.g. an additional hub member 54 to accommodate magnets 44 which may be slightly wider than the mean value. Any space between the magnets 44 and side plates 48 after assembly may be filled with an epoxy varnish or similar material which hardens to hold the magnets motionless within the rotor 40.

As best shown in FIGS. 2,3 and 5, a plurality of fastener holes 68 is drilled or preferably punched in a first pattern or array about each hub member 54, preferably within the radial outer half thereof. If punched, these fastener holes 68 should have a diameter of at least ⅛ inch, and preferably at least ¼ inch for rotors 40 of 16 inches or greater overall diameter 72.

The permanent magnets 44 shown in the drawings are rectangular parallelepipeds in shape. Other magnet shapes may be used, provided the magnets fit into and are held immobile by the slots.

Each pole piece 46 is an outer retainer for a magnet 44. As shown, the pole piece 46 is comprised of a plurality of pole piece members 74 (FIG. 3) which are stamped from a magnetically conductive sheet or plate material such as low carbon steel. Preferably, all pole piece members 74 of a pole piece are identical. The superior magnetic conduction properties of low carbon steel as compared to sintered iron and the use of magnets having no central bolt hole enables the use of shorter magnets, providing a substantial savings in magnet material, while achieving the same performance.

As shown in FIG. 3, each pole piece member 74 is elongated and has an outer edge 76 which is preferably of constant radius, having a radius generally equal to half the overall rotor diameter 72. The opposed (inner) edge 80 includes a slot 82 into which the outer end 52B of a magnet 44 may be inserted and held immobile. Thus, as seen in FIGS. 2 and 3, the outer end 52B and inner end 52A, together with portions of the third and fourth sides 52C, 52D, respectively, of magnet 44 are held in slots 56 and 82. Fastener holes 86 are punched or drilled through the thin pole piece members 74 such that passage of fasteners 50B such as rivets may join a plurality of pole piece members 74 together as a single pole piece 46. The number of fastener holes 86 in the pole piece members is at least 2 and preferably 4 for most rotors. The required number and size of fasteners 50B will depend upon the centrifugal force developed by the weight of magnet 44 and pole piece 46, and the strength of the fasteners. Fasteners 50A and 50B may be either magnetically or non-magnetically conductive, the former being preferred because of strength and cost considerations.

As illustrated, the permanent magnets 44 have the shape of a rectangular parallelepiped. However, the hub members 54 and pole pieces 46 of the rotor 40 may be configured to hold magnets 44 of any shape provided the magnets are dimensionally compatible with the space available between the hub 42 and pole pieces 46.

Adjacent magnets 44 are spaced from each other by air gaps 84 as known in the art.

The side plates 48A, 48B comprise the outer shell of the rotor 40, and enclose the hub 42 and pole pieces 46, together with the magnets 44 mounted in slots 56 and 82. Inner fastener holes 88A and outer fastener holes 88B are punched or drilled in the side plates 48A and 48B to match the first pattern or array of fastener holes 68 in the hub 42 and the second pattern or array of fastener holes 86 in the pole pieces 46, respectively.

The rotor 40 is easily assembled. For example, a desired number of hub members 54 may be stacked atop a first side plate 48A to have aligned slots 56, aligned central shaft holes 58 with keyways 62, and aligned fastener holes. Fastener holes 88A of the side plates 48A and 48B align with fastener holes 68 in the hub 42, and holes 88B of the side plates 48A and 48B align with fastener holes 86 of the pole pieces 46.

Permanent magnets 44 are then inserted into the peripheral slots 56 to extend radially outward. A desired plurality of pole piece members 74 is then stacked and placed atop the outer end 52B of each magnet 44. A second side plate 48B is then placed over the assembled hub members 54, magnets 44, and pole piece members 74.

Elongate fasteners 50A and 50B with heads 92A, 92B, respectively, such as rivets are passed through the matching fastener holes and their "tail" ends, i.e. insertion ends 90A, 90B, (FIG. 4), respectively, expanded to join the components and form the unitary rotor 40.

In another method of assembly, some or all of the fasteners 50 may be first inserted through the first side plate 48A, and then each hub member 54 and pole piece member 74 "threaded" onto the tail ends 90A and 90B of the fasteners 50 to form the respective stacks forming the hub 42 and pole pieces 46. The magnets 44 may be inserted at any point in the operation prior to attaching the second side plate 48B and expanding the tail ends 90A and 90B of the rivet fasteners 50. Any rivets 50 not inserted initially are inserted after the rotor is assembled but not fully riveted. The assembled rotor 40, after completion of the riveting, is very rigid and resistant to breakage.

The assembled rotor 40 is preferably coated under vacuum with an electrical motor varnish to fill the interstices between the various laminated members, provide a degree of protection from harm during handling, and protect against corrosion. In addition, any spaces between a magnet 44 and the side plates 48A and 48B, hub 42 and pole pieces 46 become filled with a hardened varnish to prevent any movement thereby within the rotor 40. An epoxy based varnish or similar polymeric compositions known in the art may be used as protective coatings.

The assembled rotor, as fabricated for a generator in accordance with this description, has a weight approximately equal to a prior art rotor, yet it provides enhanced power generation and is less expensive to manufacture. Most machining operations required by the prior art hub 12 are eliminated.

The assembled rotor 40 is typically placed in a mandrel and rotated in a machining process to provide the desired outer diameter and uniform rotor-stator air gaps for optimum performance.

The rotor 40 may be precision balanced by securing weights in balance holes 94 formed in the side plates 48A, 48B.

Using a single size of hub members 54 and pole piece members 74, rotors of different widths, smaller or larger magnets, and a differing numbers of poles may be constructed by simply varying the numbers of hub members, pole piece members, and magnets which are utilized.

EXAMPLE

A prototype rotor 40 of the present invention was made as a replacement for a prior art rotor 10 (FIG. 1) of a permanent magnet (PMG) generator manufactured by Kato Engineering, Inc. The prior art rotor 10 had 12 pole pieces and an overall diameter of 15.89 inches. The twelve Alnico magnets 16 were rectangular parallelepipeds with length 3¼ inch, width 2 inches, and thickness 1⅝ inches. A central bolt hole for a ½ inch diameter bolt 20 passed through the length of each of the magnets 16. The volume of metal in each magnet 16 was about 7.8277 cubic inches.

The prototype rotor 40 embodying the invention had the same diameter and number of poles as the rotor 10. The hub and pole pieces of the rotor 40 were laminated from multiple hub members 54 and pole piece members 74 stamped from 16 gauge mild steel plate. Parallelopiped Alnico magnets 44 with side dimensions of length 2⅜ inches, width 2 inches, and thickness 1⅝ inches were used, giving a total volume of about 6.234 cubic inches for each magnet. The quantity of Alnico material in these magnets 44 was about 20 percent less than in the magnets 16 of the prior art rotor 10.

Figure 8:
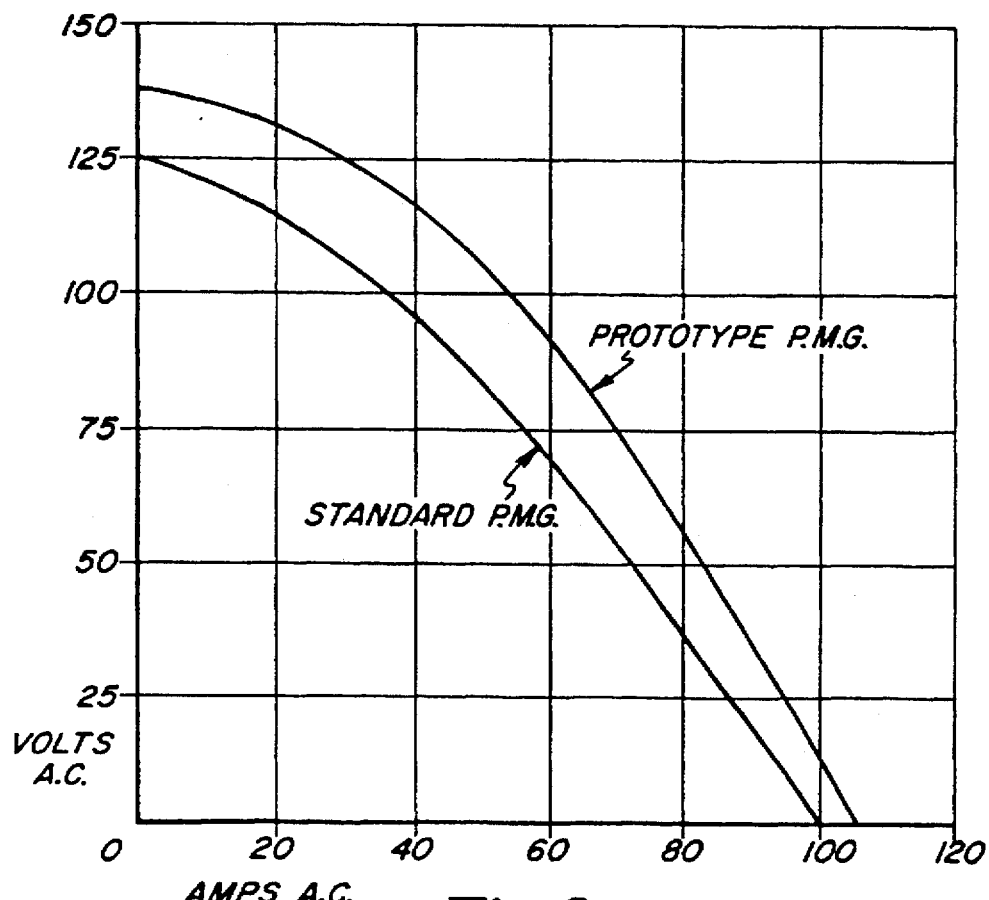
FIG. 8 is a graphical depiction of the voltage versus current characteristics for generated voltage of a generator using the rotor of the prior art and a second generator utilizing the rotor of the invention.

The prior art rotor 10 and prototype rotor 40 of the invention were compared on a test fixture at 1760 RPM and unity power factor. The resulting volt-amp curves for the two rotors are compared in FIG. 8. It is evident that the prototype rotor 40 was superior to the prior art rotor 10 despite the smaller magnets 44, providing about 12.5 more volts at a no-load condition, and significantly more voltage at a given amperage over the entire volt versus ampere curve. It is surmised that a large part of the increased voltage is due to the improved magnetic properties of the pole piece 46, i.e. mild steel versus the prior art sintered steel with central hole and to the ability to use magnets without a central bolt hole.

Figure 6:
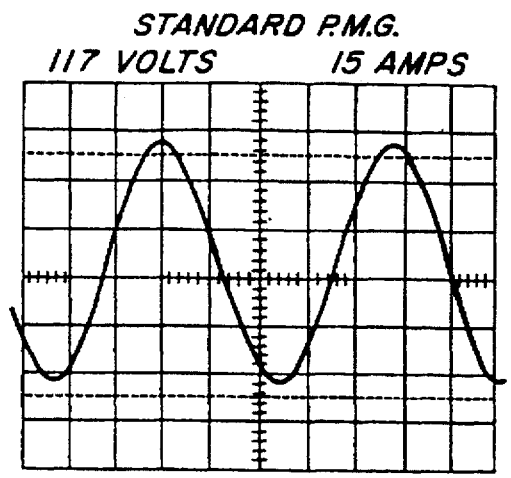
FIG. 6 is a graphical depiction of the phase characteristic for a generator utilizing a rotor like that of FIG. 1.
Figure 7:
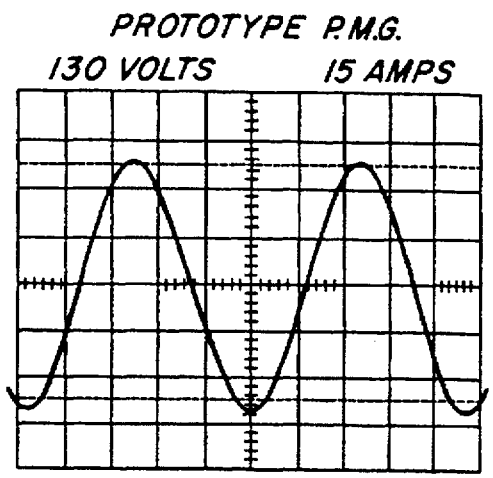
FIG. 7 is a graphical depiction of the phase characteristic for a generator utilizing a rotor embodying the invention.

The phase characteristic of the generated voltage for the prototype rotor 40 was measured and compared with that of the prior art rotor 10 at an output of 15 amps. As shown in FIGS. 6 and 7, the phase characteristics produced by the two rotors 10, 40 were essentially equivalent, i.e. no significant difference was detected.

It is anticipated that various changes and modifications may be made in the construction, arrangement, operation and method of construction of the rotor disclosed herein without departing from the spirit and scope of the invention as defined in the following claims.

What is claimed is:

1. A rotor for an electrical energy conversion transducer, and useable on a rotatable shaft, comprising:

a hub having a central axial hole for mounting on the shaft, said hole having a central axis;

a plurality of permanent magnets arrayed about said hub and having inner and outer ends;

said hub formed as a unitary laminated core from a stacked plurality of flat metal plates, each said flat metal plate continuously encircling said shaft and having an outer periphery;

a plurality of spaced slots in said outer periphery for retaining the said inner ends of said permanent magnets;

a plurality of magnetically conductive pole pieces positioned On the outer ends of said magnets: and first and second side plates positioned on axially opposing sides of said hub, magnets and pole pieces and connected to said hub and pole pieces by fasteners.

2. The rotor of claim 1, further comprising a first pattern of fastener holes through said hub and side plates for passage therethrough of a first set of said fasteners parallel to said central axis.

3. The rotor of claim 2, wherein said fasteners comprise rivets.

4. The rotor of claim 1, further comprising a second pattern of fastener holes passing through said pole pieces and side plates for passage therethrough of a second set of fasteners parallel to central axis.

5. The rotor of claim 4, wherein said fasteners comprise rivets.

6. The rotor of claim 1, wherein each said pole piece comprises a plurality of magnetically conductive metal sheet members contained between said side plates as a laminate.

7. The rotor of claim 1, further comprising holes in said side plates for mounting balance weights to rotationally balance said rotor.

8. The rotor of claim 1, wherein said transducer is a generator.

9. A rotor for an electrical energy conversion transducer comprising:

a hub formed as a unitary core lamination of a plurality of flat metal plates, said flat metal plates having a central axial driveshaft hole with an axis and an outer periphery, each said metal plate continuous about said axis;

a plurality of permanent magnets having inner and outer ends;

said hub including a plurality of spaced peripheral slots along said outer periphery of said plates for retaining said inner ends of said permanent magnets, and further including a first set of fastener holes parallel to said driveshaft hole;

said magnets extending radially outward from said hub and positioned in said peripheral slots;

a plurality of pole pieces, each said pole piece having an inside slot for retaining said outer end of a said magnet, each said pole piece including a second set of fastener holes parallel to said driveshaft hole;

a pair of side plates, a said side plate on each side of said hub to enclose said magnets, pole pieces and a portion of said hub, said side plates having fastener holes communicating with the first and second sets of fasteners holes of said hub and pole pieces; and fasteners passing through said first and second sets of holes and said communicating holes of said side plates to rigidly join said side plates, hub and pole pieces and enclose said magnets.

10. The rotor of claim 9, wherein said pole piece comprises a plurality of magnetically conductive metal sheet members joined together as a laminate.

11. The rotor of claim 9, wherein said elongate fasteners comprise rivets.

12. A pole piece for the rotor of an electrical energy power conversion transducer with a shaft, comprising a stack of thin flat sheet members formed of magnetically conductive material, each said thin sheet member having a substantially constant radius outer periphery, an inner edge with a slot for retaining the radially oriented outer end of a permanent magnet having ends and sides, and a plurality of fastener holes punched therethrough wherein said sheet members may be mounted as a laminate to define said pole piece, said slot having sides conformed to generally abut said magnet sides.

13. The pole piece of claim 12, wherein the plurality of fastener holes comprises four.

* * * * *